(12) United States Patent
Lewis

(10) Patent No.: US 10,719,633 B2
(45) Date of Patent: Jul. 21, 2020

(54) INHIBITING A PENETRATION ATTACK

(71) Applicant: Utimaco, Inc., Campbell, CA (US)

(72) Inventor: John M. Lewis, Sunnyvale, CA (US)

(73) Assignee: UTIMACO, INC., Campbell, CA (US)

( * ) Notice: Subject to any disclaimer, the term of this patent is extended or adjusted under 35 U.S.C. 154(b) by 115 days.

(21) Appl. No.: 15/507,683

(22) PCT Filed: Apr. 29, 2015

(86) PCT No.: PCT/US2015/028248
§ 371 (c)(1),
(2) Date: Feb. 28, 2017

(87) PCT Pub. No.: WO2016/175790
PCT Pub. Date: Nov. 3, 2016

(65) Prior Publication Data
US 2017/0308719 A1    Oct. 26, 2017

(51) Int. Cl.
*G06F 21/76* (2013.01)
*G06F 21/50* (2013.01)
*G06F 21/70* (2013.01)
*G06F 21/56* (2013.01)
*G06F 21/86* (2013.01)

(52) U.S. Cl.
CPC .............. *G06F 21/76* (2013.01); *G06F 21/50* (2013.01); *G06F 21/70* (2013.01); *G06F 21/86* (2013.01); *G06F 21/562* (2013.01)

(58) Field of Classification Search
CPC .......... G06F 21/76; G06F 21/70; G06F 21/86; G06F 21/50; G06F 21/562
USPC ...................................................... 726/22, 23
See application file for complete search history.

(56) References Cited

U.S. PATENT DOCUMENTS

| 5,523,742 A | * | 6/1996 | Simkins | ............... | A61B 5/1126 200/61.45 R |
| 7,256,977 B2 | * | 8/2007 | Nakata | ..................... | G01W 1/16 361/117 |
| 7,349,223 B2 | | 3/2008 | Haemer et al. | | |
| 8,522,049 B1 | | 8/2013 | Ahmadi | | |
| 8,589,703 B2 | * | 11/2013 | Lee | ......................... | G06F 21/86 257/922 |

(Continued)

FOREIGN PATENT DOCUMENTS

| EP | 1045352 A1 | 10/2000 |
| TW | M330581 U | 4/2008 |

(Continued)

OTHER PUBLICATIONS

Davood Shahrjerdi et al., "Shielding and Securing Integrated Circuits with Sensors," Aug. 21, 2014, pp. 1-5, Available at: <aceslab.org/sites/default/files/ICCAD2014.pdf>.

(Continued)

*Primary Examiner* — Jahangir Kabir
(74) *Attorney, Agent, or Firm* — Wilmer Cutler Pickering Hale and Dorr LLP

(57) ABSTRACT

A technique includes providing a security monitor to at least detect a penetration attack on a circuit assembly that contains the security monitor. The technique includes inhibiting success of the penetration attack, including flexibly mounting the security monitor to the circuit assembly to allow the security monitor to move in response to the security monitor being contacted during the penetration attack.

14 Claims, 4 Drawing Sheets

(56) References Cited

U.S. PATENT DOCUMENTS

| | | | |
|---|---|---|---|
| 2002/0002683 A1 | 1/2002 | Benson et al. | |
| 2002/0104872 A1* | 8/2002 | DeFelice | G06F 21/86 |
| | | | 228/103 |
| 2010/0213590 A1 | 8/2010 | Warren et al. | |
| 2011/0031982 A1 | 2/2011 | Leon | |
| 2012/0256305 A1* | 10/2012 | Kaufmann | G06F 21/87 |
| | | | 257/659 |
| 2015/0189447 A1* | 7/2015 | Vinter | H04R 25/30 |
| | | | 381/323 |

FOREIGN PATENT DOCUMENTS

| | | |
|---|---|---|
| TW | M458435 U | 8/2013 |
| WO | WO-9921142 A1 | 4/1999 |
| WO | WO-2001063994 A2 | 8/2001 |
| WO | WO-2014158159 A1 | 10/2017 |

OTHER PUBLICATIONS

International Search Report and Written Opinion, International Application No. PCT/US2015/028248, dated Feb. 25, 2016, pp. 1-12, KIPO.

\* cited by examiner

INHIBITING A PENETRATION ATTACK

BACKGROUND

A given computer system (a data center, for example) that processes and/or stores sensitive data typically employs measures to protect the data from unauthorized access. For example, the computer system may process and/or store such sensitive information, as credit cardholder data, patient records, personnel information, intellectual property, and so forth.

The protective measures may guard against unauthorized access while the sensitive data is in motion (while the data is being communicated across communication channels, for example). For example, the computer system may encrypt data that is communicated across communication channels. The protective measures may further guard against access to cryptographic keys that are stored by the computer system and used by the system to encrypt/decrypt the sensitive data.

DETAILED DESCRIPTION

Figure 1A:
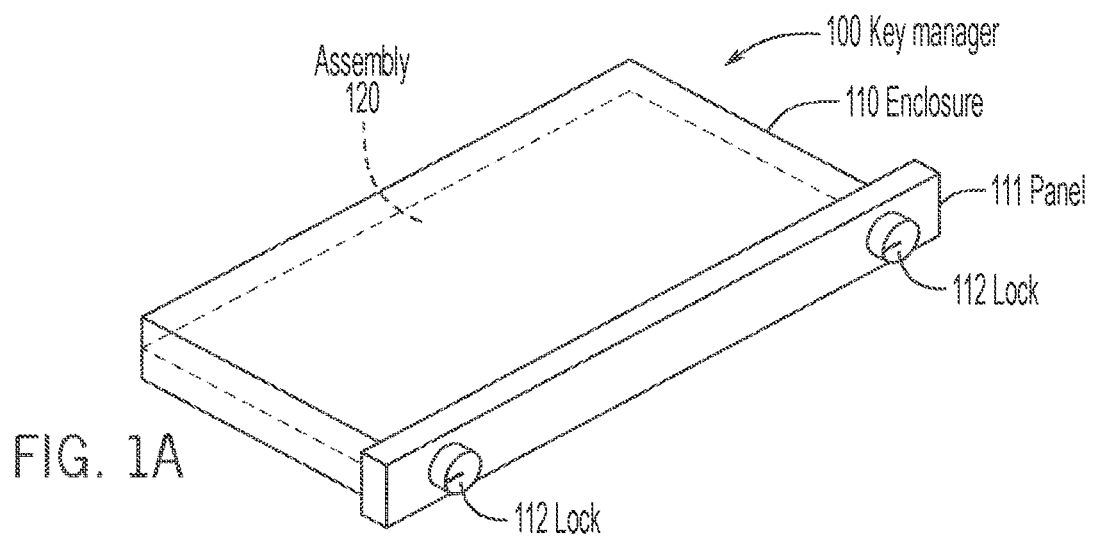
FIG. 1A is a perspective view of a secure key manager according to an example implementation.

An electronic system that processes and/or stores sensitive data (data representing patient records, personnel records, credit cardholder information, banking information, intellectual property, and so forth) may encrypt and decrypt the sensitive data while in transit. In this manner, the electronic system may communicate encrypted, sensitive data for internal communications within the electronic device (communications between the system's processing cores and memories, for example), as well as communicate encrypted, sensitive data in external communications between the system and other electronic systems.

For the purpose of encrypting and decrypting the sensitive data, the electronic system may use one or multiple cryptographic keys, called "security keys" herein. In this manner, the electronic system may store the security keys in one or more protected memories of the system. Because access to the security keys allows access to the underlying sensitive data, the electronic system may have a physical security barrier to prevent, or at least inhibit, unauthorized access to the stored security key(s). For example, sensitive components of the electronic system, which store security keys, may be enclosed by a locked, metal container, which forms at least part of a physical security barrier to guard against unauthorized access to the stored keys. In this manner, the metal enclosure may have no open ports through which a tool (a probe, a punch through device, and so forth) may be inserted for such purposes as sensing electrical signals (representing the keys, for example), physically extracting memory storing security keys, and so forth.

The electronic system may still be vulnerable to a "penetration attack," even when enclosed in a metal container. A penetration attack is a physical attack on an electronic system in which a tool is used to penetrate the system's physical security barrier (such as a metal container) for purposes of gaining access to information (such as one or multiple security keys) that is stored in the system. For example, the tool may contain a drill or punch to form a hole in the metal container (and/or other enclosure or security barrier) of the electronic system, and a probe may be inserted into the hole to sense one or multiple electrical signals of the electronic system for purposes of retrieving the security key(s). Another type of penetration attack, called a "punch through attack" herein, employs a tool to penetrate into integrated circuits of the electronic system for purposes of extracting memory-containing circuitry and reading any data stored therein.

For purposes of thwarting a penetration attack, the electronic system may contain one or multiple penetration detection boundaries. The penetration boundary(ies) allow the electronic system to detect an ongoing penetration attack, so that the electronic system may timely take corrective action. In this regard, when a penetration attack is detected, the electronic system may take such actions as alerting a system administrator; alerting security personnel; erasing security keys before the keys are extracted; power off or shutting down operations of the electronic system, and so forth.

A given penetration detection boundary may be formed from one or multiple traces in one or multiple metal layers of a circuit substrate (a printed circuit board substrate (PCB), for example). The trace(s) are arranged in pattern(s) so that when a penetration attack occurs, which penetrates the circuit substrate, at least one trace is broken. Due to signal interruption(s) caused by the broken trace(s), the electronic system is alerted to the attack. More specifically, the electronic system may contain a circuit called a "security monitor" herein, which may be coupled to penetration detection traces to detect a signal interruption that indicates a penetration attack.

The security monitor may be unable to respond quickly enough during a penetration attack to prevent sensitive information from being extracted from the electronic system. For example, a punch through attack may punch out, or remove, memory-containing circuitry from the electronic system before the system has time to undertake operations to erase sensitive data stored in the circuitry. Moreover, a punch through attack may disable the security monitor before the security monitor can respond.

Systems and techniques are disclosed herein, which provide additional time for a security monitor to respond to a penetration attack, such as a punch through attack. In particular, in accordance with example implementations, the security monitor is mounted on a circuit substrate assembly, referred to as a "daughter card" herein; and the daughter card, is flexibly mounted to another circuit substrate called a "base card" herein. The flexible mounting of the daughter card to the base card creates a spring-like cushion, which allows the daughter card to move if the card is contacted with a tool during a punch through attack. In this manner, because the flexible mounting allows the daughter card to move with the punch through tool, the punch through tool is at least momentarily unable to penetrate circuitry of the daughter card when the tool first contacts the card. Although the punch through tool may be able to penetrate the daughter card after the tool eventually presses the daughter card into the base card, a time delay is created between the time of initial contact and the time that penetration occurs. Therefore, additional time is created for the security monitor to successively take and complete corrective action to prevent the punch through attack from being successful.

Referring to FIG. 1A, as a more specific example, an electronic system (a processor-based data center, for example) may contain one or multiple secure key managers, such as example secure key manager 100, for purposes of managing, protecting, serving and preserving security keys for the system. The secure key manager 100 may, in accordance with example implementations, be a blade that is constructed to be received in a backplane bus slot of a computer system rack.

The secure key manager 100 may have one or multiple physical security barriers that protect the sensitive components of the manager 100 against a penetration attack. For example, as depicted in FIG. 1A, the secure key manager 100 may have an outer metal enclosure 110 that surrounds, or encloses, a circuit board assembly 120. The circuit board assembly 120 contains various integrated circuits (ICs) that, in general, perform the functions of the secure key manager 100 and store sensitive information (security keys, data encrypted by security keys, and so forth) for the manager 100.

In accordance with example implementations, the metal enclosure 110 may, in general, have no ports, or openings, through which a penetration attack may occur (through which a punch through tool or probe may be inserted, for example) for purposes of gaining access to the security key(s) and/or other sensitive information stored inside the secure key manager 100. The secure key manager 100 may communicate with external circuitry using (as examples) connector sockets, optical signaling, inductive coupling connections, and so forth. The metal enclosure 110 may include various security mechanisms, such as (as an example) key locks 112, which secure the enclosure 110 from being opened (by removal of a front panel 111 of the enclosure 110, for example) except when two keys (keys held by two authorized employees, for example) are concurrently inserted and turned.

Figure 1B:
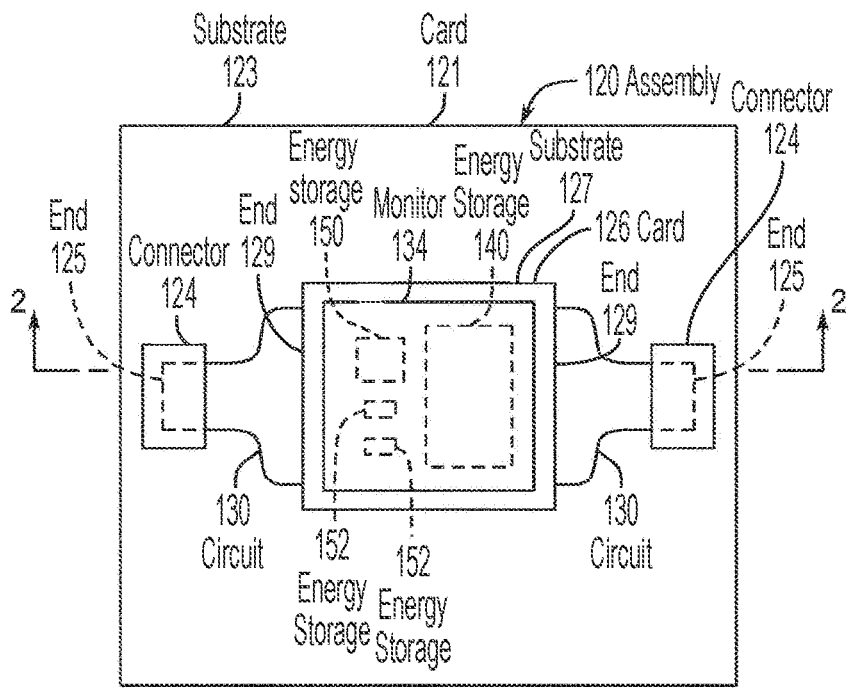
FIG. 1B is a top view of a circuit assembly of the secure key manager according to an example implementation.

Referring to FIG. 1B, in accordance with an example implementation, the circuit board assembly 120 includes a base circuit board substrate assembly 121, called a "base card 121" herein. As an example the base card 121 may include a circuit substrate 123, such as a printed circuit board (PCB), and various ICs may be mounted on the upper surface of the substrate (for the orientation of the circuit board assembly 120 depicted in FIG. 1B). One or multiple ICs of the base card 121 may contain a memory that stores sensitive information for the secure key manager 100.

The circuit substrate 123, in accordance with example implementations, is a multiple layer substrate, which contains metal layers and intervening insulating layers. One or multiple metal layers of the circuit substrate 123 may contain traces for purpose of routing signals, power and ground for the ICs of the base card 121.

Moreover, one or multiple metal layers of the circuit substrate 123 may contain one or multiple traces that are patterned to form a penetration detection boundary of the secure key manager 100. In this manner, the penetration detection boundary is constructed to provide an indication to the secure key manager 100 when a penetration attack at least partially penetrates the circuit substrate 123.

More specifically, in accordance with example implementations, the secure key manager 100 contains a circuit called a "security monitor 134," which is electrically coupled to the traces of the penetration boundary of the base card 121 for purposes of being alerted when a penetration attack or attempted penetration attack through/into the circuit substrate 123. In this manner, the security monitor 134 monitors the traces of the base card's penetration detection boundary for purposes of detecting when a signal interruption (indicative of a penetration attack through the substrate 123) occurs. In particular, the penetration detection boundary of the base card 121 is positioned to alert the security monitor 134 when a penetration attack (more specifically, a "punch through attack") originating from a region below the base card 121 (for the orientation depicted in FIG. 1B) occurs. The security monitor 134 may also be coupled to a penetration detection boundary that provides an alert for a penetration attack that originates from a region above the base card 121 (for the orientation depicted in FIG. 1B). In this manner, the circuit board assembly 121 may be covered with another circuit board substrate (a flexible circuit substrate, for example), which is not shown in FIG. 1B. This other circuit board substrate contains a penetration detection boundary and is electrically coupled (via at least one connector, not shown) to the security monitor 134, in accordance with example implementations.

In accordance with example implementations, the security monitor 134 is disposed on a circuit board substrate assembly 126, called a "daughter card 126" herein. As depicted in FIG. 1B, the daughter card 126 may be smaller than the base card 121; the security monitor 134 may be mounted to a circuit substrate 127 (a PCB substrate, for example) of the daughter card 126; and the security monitor 134 may, in general, occupy most of the upper surface area of this circuit board substrate 127. The circuit substrate 127 may, in general, be a multiple layer substrate, which contains metal layers and intervening insulating layers.

One or multiple metal layers of the circuit substrate 127 may contain traces for purpose of routing signals, power and ground for the ICs of the daughter card 126, such as the security monitor 134 as well as other circuitry described herein. Moreover, one or multiple metal layers of the circuit substrate 127 may contain traces that form a penetration detection boundary, which may be electrically coupled to the security monitor 134.

In accordance with example implementations, the daughter card 126 is not rigidly mounted to the base card 121. Rather, in accordance with example implementations, the daughter card 126 contains one or multiple flexible connections that mechanically and electrically couple the daughter card 126 to the base card 121. For the specific implementation that is depicted in FIG. 1B, two flexible connections mechanically and electrically couple the daughter card 126 to the base card 121. As an example, a given flexible connection may be formed from a flexible printed circuit substrate, or flexible circuit 130 (also called a "flex circuit"), which has ends 125 and 129 that terminate on the base card 121 and daughter card 126, respectively.

As a more specific example, in accordance with some implementations, the end 125 of the flexible circuit 130 may terminate in a connector 124 that is disposed on the base card 121. As examples, the connector 124 may be a zero insertion force (ZIF), a low insertion force (LIF) connector, a surface mount connector or a through hole connector. Other connectors may be used, in accordance with further example implementations. In general, the end 125 of the flexible circuit 130 is secured, or mechanically held, by the connector 124, and electrical traces of the flexible circuit 130, which extend into the end 125 form electrical connections with electrical contacts of the connector 124. The opposite end 129 of the flexible circuit 130 may likewise terminate in a connector (not shown) that is mounted to the daughter card 126, such as a ZIF, LIF, surface mount or through hole connector, as examples.

Figure 2:
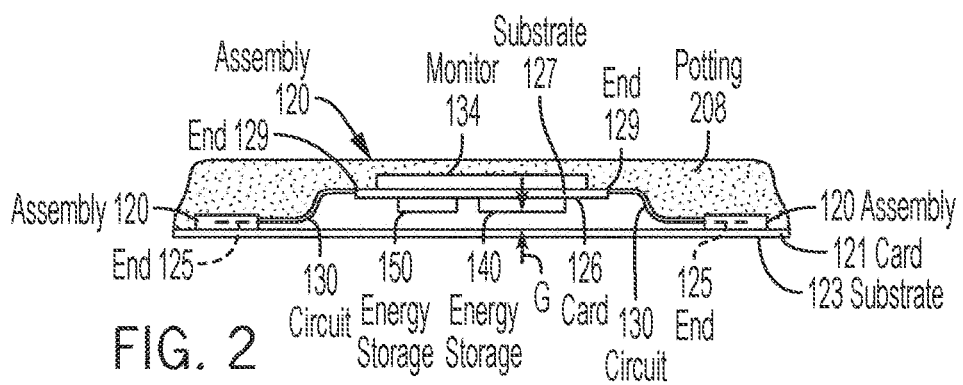
FIG. 2 is a cross-sectional view of the circuit assembly taken along line 2-2 of FIG. 1B according to an example implementation.

FIG. 2 depicts a cross-sectional view of the circuit assembly 120 of FIG. 1B, with the addition of potting material 208. The potting material 208 may be, as an example, an electrically nonconductive, insulating, gel, epoxy or other material, which coats the upper surface of the circuit assembly 120. The secure key manager 100 may not include potting material, in accordance with further example implementations. As depicted in FIG. 2, the flexible circuits 130 have sufficient respective lengths to suspend the daughter card 126 over the base card 121. In this manner, as depicted in FIG. 2, a clearance, or gap G, exists between the bottommost surface of the daughter card 126 and the uppermost surface of the base card 121.

The gap G, in combination with the flexible nature of the circuits 130, creates a spring-like cushion that allows the daughter card 126 to move if the daughter card 126 is contacted by a tool from above during a punch through attack. This movement, in turn, momentarily prevents the daughter card 126 from exerting a sufficient reaction force on the tool, which would otherwise allow the tool to punch into the card 126 (and possibly extract memory circuitry of the card 126, for example).

Figure 3:
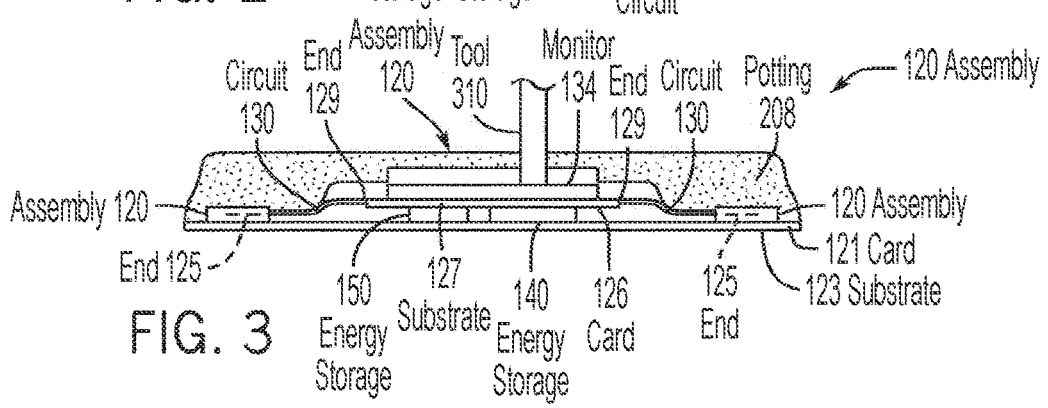
FIG. 3 is a cross-sectional view of the circuit assembly illustrating, in conjunction with FIG. 2, movement of a daughter card of the assembly during a punch through attack.

More specifically, referring to FIG. 3 in conjunction with FIG. 2, when contacted by a tool 310 from above during a punch through attack, the daughter card 126 moves with the tool 310 until the tool 310 presses the daughter card 126 firmly against the base card 121. When the tool 310 is able to press the daughter card 126 against the base card 121, the tool 310 may be able to punch into the card 126 and possibly extract memory circuitry of the card 126 (by extracting the circuitry through a hollow point of the tool 310, for example). However, due to the flexible mounting of the daughter card 126 to the base card 121, a delay is created between the time when the tool 310 first contacts the daughter card 126 and the time at which punch out of a portion of the card 126 may occur. Therefore, even if the punch through attack succeeds in extracting circuitry from the daughter card 126, the security monitor 134 has additional time created by flexible mounting of the daughter card 126 to take corrective action. In this manner, the additional time may allow the security monitor 134 to erase sensitive information (keys, encrypted data and so forth) before memory circuitry of the security monitor 134 (or of another component) is extracted and/or before the security monitor 134 is disabled due to the punch through attack.

In accordance with example implementations, the security monitor 134 contains one or multiple memories that store sensitive data for the secure key manager 100. Therefore, in response to detecting a penetration attack, the security monitor 134 may erase its own memory contents. Moreover, in accordance with example implementations, the security monitor 134 may erase the memory contents (via communications or signaling) of other devices of the secure key manager 100, when a penetration attack is detected.

Figure 4:
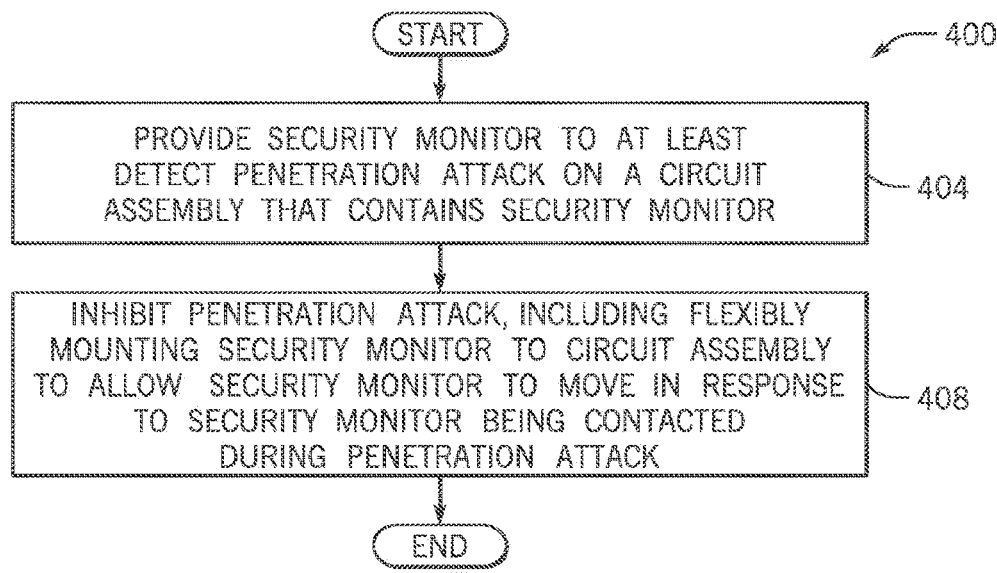
FIG. 4 is a flow diagram depicting a technique to inhibit a penetration attack according to an example implementation.

Referring to FIG. 4, to summarize, in accordance with example implementations, a technique 400 includes providing (block 404) a security monitor to at least detect a penetration attack on a circuit assembly that contains the security monitor. The technique 400 includes inhibiting (block 408) a penetration attack, including flexibly mounting the security monitor to the circuit assembly to allow the security monitor to move in response to the security monitor being contacted during the penetration attack.

In accordance with example implementations, the daughter card 126 may have features that create additional time for the security monitor 124 to respond to a punch through attack (in addition to the time created by the flexible mounting of the daughter card 126 to the base card 121). In this manner, referring to FIG. 2, in accordance with example implementations, the security monitor 134 is mounted on top surface of the circuit substrate 127 of the daughter card 126, and energy storage circuits 140, 150 and 152 are mounted on the bottom surface of the circuit substrate 127. The energy storage circuits 140, 150 and 152 provide temporary power for memory-containing circuitry of the security monitor 134, which might be removed in a punch through attack.

More specifically, when the circuit assembly 120 is intact, the circuit components (the security monitor 134, energy storage circuits 140, 150, 152, and so forth) of the daughter card 126 receive electrical power through electrical conductors of one or both flexible circuits 130. In this manner, the electrical conductors may be voltage supply and ground rails that communicate electrical power from power supply/distribution circuitry that is disposed on the base card 121 to the circuit components of the daughter card 126. The energy storage circuits 140, 150 and 152 receive the power from the base card 121 and store energy in response thereto. As an example, the energy storage circuits 140, 150 and 152 may include spatially distributed arrays of capacitors that are charged from the power that is communicated from the base card 121; and the security monitor 134 may be an integrated circuit package, such as a microprocessor core-based package. In accordance with further example implementations, the energy storage circuit 140, 150 or 152 may include one or multiple devices that store energy other than capacitors, such as (as examples) electrochemical cells and flat batteries.

In accordance with example implementations, the energy storage circuits 140, 150 and 152 are disposed directly beneath associated circuits of the security monitor 134, which are independently autonomous and perform important functions for the security monitor 134, such as processor core circuits containing memories and other memory-containing autonomous circuits, for example. Moreover, vias of the circuit substrate 127 of the daughter card 126 electrically couple the energy storage circuits 140, 150 and 152 to the power supply terminals of their associated circuits of the security monitor 134. Therefore, in the event that a punch through attack removes one of these circuits of the security monitor 134, there is a relatively high likelihood that its associated temporary memory storage, located directly beneath, is also removed. As a result, even though a given circuit may be removed from the daughter card 126 in a punch through attack, the circuit receives power for an additional time after its removal, thereby allowing the circuit time to respond to the attack (e.g., additional time is created to allows the extracted circuit to erase its associated memory contents, for example).

It is noted that the daughter card 126 may have circuit components, other than/in addition to the security monitor 134 and energy storage circuits 140, 150 and 152, in accordance with further example implementations. Moreover, in accordance with further example implementations, the daughter card 126 may have more than three or less than three energy storage circuits.

Figure 5:
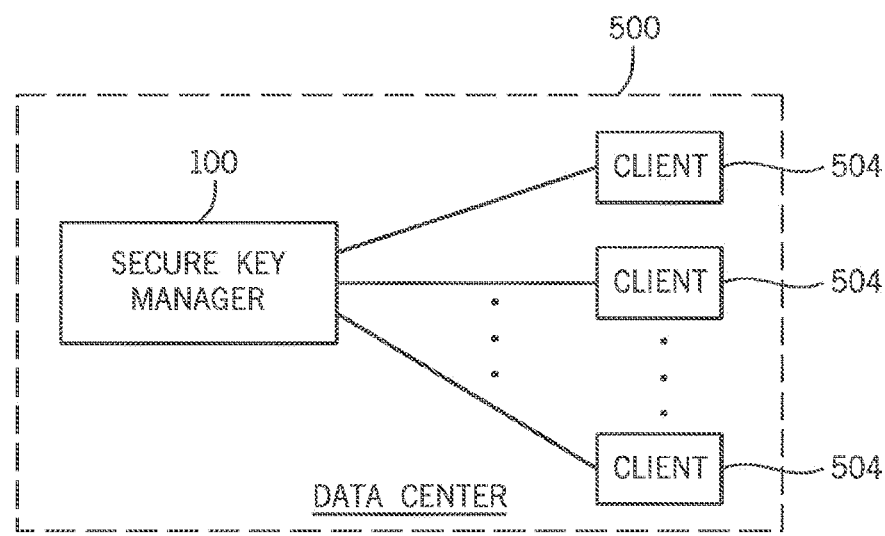
FIG. 5 is a schematic diagram illustrating a data center according to an example implementation.

Referring FIG. 5, in accordance with example implementations, the secure key manager 100 may be part of a data center 500, in which the secure key manager 100 manages, stores and serves keys for one or multiple clients 504 of the data center 500. As an example, the secure key manager 100 and clients 504 may be blades that are inserted into one or more racks of the data center 500.

Figure 6:
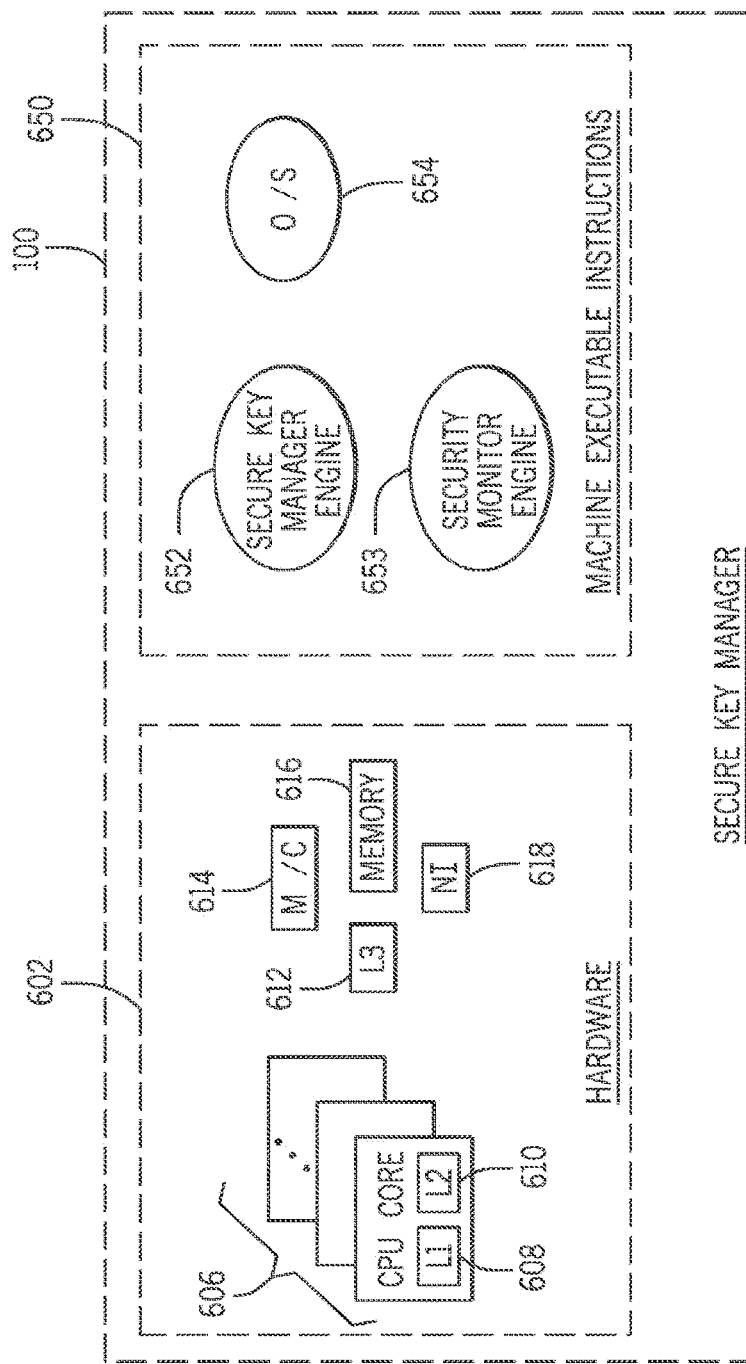
FIG. 6 is a schematic diagram illustrating an architecture of the secure key manager according to an example implementation.

In accordance with example implementations, the secure key manager 100 may have an architecture that is schematically represented in FIG. 6. Referring to FIG. 6, in general, the secure key manager 100 may include hardware 602 and machine executable instructions, or "software," 650. In general, the hardware 602 may include one or multiple central processing unit (CPU) cores 606. In accordance with example implementations, the security monitor 134 (see FIG. 2) may include one or multiple CPU cores 606; and in accordance with example implementations, one or multiple CPU cores 606 of the security monitor 134 may have an associated energy storage circuit disposed beneath the core 606, as described above. In accordance with example implementations, a given CPU core 906 may include onboard memory, such as level one (L1) cache 608 and a level two (L2) cache 610; and sensitive data (keys and so forth) may be stored in one or both caches 608 and 610.

The hardware 602 may also include memory that is accessed by the CPU core(s) 606, such as a level three (L3) cache 612 and a system memory 616. In accordance with an example implementation, sensitive data may be stored in the L3 cache 612 and/or system memory 616; and a given energy storage circuit may be disposed between circuitry containing the memory 616, L3 cache 616 and at least one of the processor cores 606.

The hardware 602 may include other and/or different components than the components that are depicted in FIG. 6 in further example implementations, such as a memory controller 614, a network interface 618, and so forth.

The software 650 may include a set of machine executable instructions that, when executed by one or multiple CPU core(s) 606, cause the CPU core(s) 606 to form a secure key manager engine 652 to manage, serve and protect keys as well as perform various cryptographic ciphers. The software 650 may include a set of machine executable instructions that, when executed by one or multiple CPU core(s) 606, cause the CPU core(s) 606 to form a security monitor engine 653 to perform one or multiple functions of the security monitor 134 (see FIG. 2), such as providing signals to penetration detection traces, receiving signals from the penetration detection traces to detect a penetration attack, taking corrective action in response to detecting a penetration attack, and so forth. The software 650 may include different and/or other machine executable instructions that when executed may form various other software components, such as an operating system 654, device drivers, applications and so forth.

Other implementations are contemplated, which are within the scope of the appended claims. For example, in accordance with further example implementations, a security monitor may be flexibly mounted to a circuit assembly in an electronic system other than a secure key manager and/or be part of a system other than a data center system.

It is noted that references herein to direction and orientation, such as "upper," "lower," top," "bottom," and so forth are used herein to describe the figures; and the substrates, circuit assemblies, cards, and so forth, may be used in a variety of orientations, depending on the particular implementation. For example, the circuit assembly 120, in accordance with example implementations, may be used in an orientation that is flipped over or turned on its inside, relative to the orientation that is depicted in FIGS. 1B, 2 and 3.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A method comprising:
   detecting, by a security monitor, a penetration attack on a circuit assembly containing the security monitor, the security monitor being flexibly mounted to the circuit assembly to allow the security monitor to move in response to being physically contacted during the penetration attack; and
   during a time period following detecting the penetration attack in which the security monitor is capable of responding to the penetration attack, taking one or more corrective actions by the security monitor, wherein during at least a portion of the time period the security monitor is moving in response to being physically contacted during the penetration attack;
   during normal operation of the circuit assembly, receiving, by the security monitor, power for circuitry of the security monitor through at least one conductor; and
   during the time period following detecting the penetration attack, receiving, by the security monitor, temporary power for the circuitry from an energy storage circuit in response to the penetration attack isolating the security monitor from receiving the power through the at least one conductor.

2. The method of claim 1, wherein the security monitor being flexibly mounted to the circuit assembly includes the security monitor being mounted on a first substrate and the first substrate being mounted to a second substrate of the circuit assembly to suspend one of the first and second substrates relative to the other substrate.

3. The method of claim 1, wherein taking one or more corrective actions comprises erasing at least one security key stored on the circuit assembly.

4. The method of claim 1, wherein the energy storage circuit is rigidly coupled to the security monitor to cause the energy storage circuit to move with the security monitor in response to the security monitor being contacted during the penetration attack.

5. An apparatus comprising:
   an enclosure;
   a penetration detection layer to provide an electrical response to a physical penetration attack directed to a secure region inside the enclosure; and
   an assembly disposed in the secure region, the assembly comprising:
   a circuit board comprising an electrical circuit, the electrical circuit being coupled to the penetration detection layer to detect the electrical response, wherein, during normal operation, the electrical circuit receives power through at least one conductor; and
   a spring mount attached to the circuit board to provide a delay between a time that the physical penetration attack contacts the circuit board and a time that the physical penetration attack disables at least part of the electrical circuit, wherein the delay creates or extends a time period for the electrical circuit to respond to the physical penetration attack, wherein, during at least a portion of the delay, the electrical circuit receives temporary power from an energy storage circuit in response to the physical penetration attack isolating the electrical circuit from receiving the power through the at least one conductor.

6. The apparatus of claim 5, wherein the spring mount comprises a flexible connector having a first end fixed with respect to the circuit board and a second end fixed with respect to the enclosure.

7. The apparatus of claim 6, further comprising a power distribution circuit to provide a power signal, wherein the flexible connector communicates the power signal to the electrical circuit.

8. The apparatus of claim 7, further comprising an energy source mounted to the circuit board, wherein the energy source charges using the power signal to provide a temporary source of power for the electrical circuit.

9. The apparatus of claim 6, wherein:
the penetration detection layer is fixed with respect to the enclosure; and
the flexible connector communicates a signal carrying the electrical response from the penetration detection layer to the electrical circuit.

10. The apparatus of claim 5, wherein the penetration detection layer comprises at least one metal layer comprising a penetration detection trace.

11. An apparatus comprising:
a first substrate;
an integrated circuit mounted to the first substrate, the integrated circuit comprising a memory storing a key, the integrated circuit receiving power through at least one conductor during normal operation;
a base substrate; and
a flexible mounting to suspend the first substrate over the base substrate and to allow the first substrate to move toward or away from the base substrate in response to the first substrate being subjected to a physical force directed toward or away from the base substrate during a physical penetration attack,
wherein the integrated circuit is configured to detect the physical penetration attack and take corrective action in response to the penetration attack, the corrective action including, during a time period following detecting the physical penetration attack, providing temporary power to the integrated circuit from an energy storage circuit in response to the physical penetration attack isolating the integrated circuit from receiving the power through the at least one conductor.

12. The apparatus of claim 11, wherein the integrated circuit is configured to erase the key in response to detecting the physical penetration attack.

13. The apparatus of claim 11, further comprising a potting material to cover the first substrate and the integrated circuit.

14. The apparatus of claim 11, wherein the base comprises a first set of at least one conductive trace forming a first penetration boundary, the first substrate comprises a second set of at least one conductive trace forming a second penetration boundary, and the conductive traces of the first and second sets are electrically coupled to the integrated circuit.

* * * * *